United States Patent
Nesteroff et al.

(10) Patent No.: US 11,533,242 B1
(45) Date of Patent: Dec. 20, 2022

(54) SYSTEMS AND METHODS FOR EFFICIENT DELIVERY AND PRESENTATION OF NETWORK INFORMATION

(71) Applicant: Juniper Networks, Inc., Sunnyvale, CA (US)

(72) Inventors: Lyubov Nesteroff, Sunnyvale, CA (US); Yelena Kozlova, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/784,398

(22) Filed: Feb. 7, 2020

Related U.S. Application Data

(60) Provisional application No. 62/950,871, filed on Dec. 19, 2019.

(51) Int. Cl.
| | |
|---|---|
| *G06F 17/00* | (2019.01) |
| *H04L 41/22* | (2022.01) |
| *G06F 9/451* | (2018.01) |
| *H04L 43/08* | (2022.01) |
| *H04L 43/045* | (2022.01) |
| *H04L 41/5003* | (2022.01) |

(52) U.S. Cl.
CPC .............. *H04L 41/22* (2013.01); *G06F 9/453* (2018.02); *H04L 41/5003* (2013.01); *H04L 43/045* (2013.01); *H04L 43/08* (2013.01)

(58) Field of Classification Search
CPC ... H04L 43/045; H04L 41/5003; H04L 43/08; H04L 41/22; G06F 9/453
See application file for complete search history.

(56) References Cited

U.S. PATENT DOCUMENTS

| | | | |
|---|---|---|---|
| 9,100,205 B1* | 8/2015 | Deshpande | G06F 16/22 |
| 9,298,925 B1* | 3/2016 | Crittall | G06F 21/577 |
| 10,547,521 B1* | 1/2020 | Roy | H04L 43/06 |
| 11,424,039 B1* | 8/2022 | Modi | G16H 50/70 |
| 2003/0046694 A1* | 3/2003 | Istvan | H04N 21/4316 725/38 |
| 2008/0270946 A1* | 10/2008 | Risch | G06F 16/34 715/848 |
| 2009/0177988 A1* | 7/2009 | Martins | G06F 16/2428 715/764 |
| 2010/0070489 A1* | 3/2010 | Aymeloglu | G06F 16/2428 707/E17.001 |

(Continued)

*Primary Examiner* — Laurie A Ries
(74) *Attorney, Agent, or Firm* — FisherBroyles, LLP

(57) ABSTRACT

A disclosed method may include (1) identifying a set of network objects associated with a network whose performance is tracked by a monitoring service, (2) grouping a first subset of the network objects based at least in part on a first attribute, (3) grouping a second subset of the network objects based at least in part on a second attribute, and then (4) providing, for presentation on a computing device in connection with the monitoring service, a graphical user interface that includes a plurality of graphical cards in a single view, wherein the plurality of graphical cards comprise at least (A) a first graphical card that is positioned in a first section and graphically represents the first subset and (B) a second graphical card that is positioned in a second section and graphically represents the second subset. Various other systems and methods are also disclosed.

18 Claims, 12 Drawing Sheets

(56) References Cited

U.S. PATENT DOCUMENTS

| | | | |
|---|---|---|---|
| 2013/0073438 A1* | 3/2013 | Jabbour | G06Q 40/00 705/30 |
| 2013/0198636 A1* | 8/2013 | Kief | G06F 16/958 715/730 |
| 2013/0271556 A1* | 10/2013 | Ross | G16H 40/20 348/14.07 |
| 2015/0046279 A1* | 2/2015 | Wang | G06F 3/0482 705/26.3 |
| 2015/0178865 A1* | 6/2015 | Anderson | G05B 17/02 705/7.25 |
| 2015/0309910 A1* | 10/2015 | Cook | H04L 67/02 709/224 |
| 2016/0088013 A1* | 3/2016 | Watson | H04L 63/1458 726/25 |
| 2016/0103581 A1* | 4/2016 | Kim | G06F 3/04842 715/711 |
| 2017/0026949 A1* | 1/2017 | Ouyang | H04L 43/08 |
| 2017/0034282 A1* | 2/2017 | Anand | H04L 43/06 |
| 2018/0136809 A1* | 5/2018 | Denneler | H04L 41/12 |
| 2018/0287902 A1* | 10/2018 | Chitalia | G06F 11/3452 |
| 2018/0300780 A1* | 10/2018 | Kaplan | G06Q 30/0601 |
| 2019/0188107 A1* | 6/2019 | Alston | G06F 11/3495 |
| 2020/0097464 A1* | 3/2020 | Subramaniam | G06F 16/288 |
| 2020/0274784 A1* | 8/2020 | Sharma | H04L 41/5067 |

\* cited by examiner

SYSTEMS AND METHODS FOR EFFICIENT DELIVERY AND PRESENTATION OF NETWORK INFORMATION

CROSS-REFERENCE TO RELATED APPLICATION

This application claims the benefit of priority under 35 U.S.C. § 119(e) of U.S. Provisional Application No. 62/950,871, filed Dec. 19, 2019, the contents of which are incorporated herein by reference in their entirety.

BACKGROUND

Networks often include various components that facilitate and/or support the flow of traffic from one device to another. The performance levels of these components may indicate and/or suggest the presence of certain network issues, bottlenecks, and/or weak links. In some examples, administrators and/or decision engines may be able to address and/or fix such network issues, bottlenecks, and/or weak links, thereby potentially improving the overall performance levels of the networks themselves.

Conventional network technologies may be unable to efficiently deliver and/or present certain network information for consumption and/or analysis by administrators and/or decision engines. As a result, administrators and/or decision engines may be forced to consume and/or analyze such network information via disjointed, convoluted, and/or disorganized delivery and/or presentation interfaces. Unfortunately, the longer network administrators and/or decision engines take to consume and/or analyze such network information, the longer the network issues, bottlenecks, and/or weak links may remain undetected and/or unidentified. Similarly, the longer the network issues, bottlenecks, and/or weak links remain undetected and/or unidentified, the longer the networks may perform sub-optimally.

The instant disclosure, therefore, identifies and addresses a need for additional systems and methods for efficient delivery and presentation of network information.

SUMMARY

As will be described in greater detail below, the instant disclosure generally relates to systems and methods for efficient delivery and presentation of network information. Embodiments of the instant disclosure may provide and/or facilitate the delivery and/or presentation of information that identifies and/or indicates the performance level of a network, such as a Software-Defined Wide Area Network (SD-WAN), in a single view. Additional embodiments of the instant disclosure may provide and/or facilitate the delivery and/or presentation of information that identifies and/or indicates the performance levels of individual links of a network for a particular site in a single view. Further embodiments of the instant disclosure may provide and/or facilitate the delivery and/or presentation of information that identifies and/or indicates the performance levels of Service Level Agreements (SLAs) across all tenants and/or customers of a service provider in a single view.

In one example, a method for accomplishing such a task may include (1) identifying a set of network objects associated with a network whose performance is tracked by a monitoring service, (2) grouping a first subset of the network objects together based at least in part on a first attribute shared in common by the first subset of network objects, (3) grouping a second subset of the network objects together based at least in part on a second attribute shared in common by the second subset of network objects, and then (4) providing, for presentation on a computing device in connection with the monitoring service, a graphical user interface that includes a plurality of graphical cards in a single view, wherein the plurality of graphical cards comprise at least (A) a first graphical card that is positioned in a first section of the graphical user interface in the single view and graphically represents the first subset of network objects grouped based at least in part on the first attribute and (B) a second graphical card that is positioned in a second section of the graphical user interface in the single view and graphically represents the second subset of network objects grouped based at least in part on the second attribute.

Similarly, a system that implements the above-identified method may include a physical processor configured to execute various modules stored in memory. In one example, this system may include and/or execute (1) an identification module that identifies a set of network objects associated with a network whose performance is tracked by a monitoring service, (2) a grouping module that (A) groups a first subset of the network objects together based at least in part on a first attribute shared in common by the first subset of network objects and (B) groups a second subset of the network objects together based at least in part on a second attribute shared in common by the second subset of network objects, and (3) a display module that provides, for presentation on a computing device in connection with the monitoring service, a graphical user interface that includes a plurality of graphical cards in a single view, wherein the plurality of graphical cards comprise at least (A) a first graphical card that is positioned in a first section of the graphical user interface in the single view and graphically represents the first subset of network objects grouped based at least in part on the first attribute and (B) a second graphical card that is positioned in a second section of the graphical user interface in the single view and graphically represents the second subset of network objects grouped based at least in part on the second attribute.

Additionally or alternatively, a non-transitory computer-readable medium that implements the above-identified method may include one or more computer-executable instructions. When executed by at least one processor of a computing device, the computer-executable instructions may cause the computing device to (1) identify a set of network objects associated with a network whose performance is tracked by a monitoring service, (2) group a first subset of the network objects together based at least in part on a first attribute shared in common by the first subset of network objects, (3) group a second subset of the network objects together based at least in part on a second attribute shared in common by the second subset of network objects, and then (4) provide, for presentation on the computing device or another computing system in connection with the monitoring service, a graphical user interface that includes a plurality of graphical cards in a single view, wherein the plurality of graphical cards comprise at least (A) a first graphical card that is positioned in a first section of the graphical user interface in the single view and graphically represents the first subset of network objects grouped based at least in part on the first attribute and (B) a second graphical card that is positioned in a second section of the graphical user interface in the single view and graphically represents the second subset of network objects grouped based at least in part on the second attribute.

Features from any of the above-mentioned embodiments may be used in combination with one another in accordance with the general principles described herein. These and other embodiments, features, and advantages will be more fully understood upon reading the following detailed description. While the exemplary embodiments described herein are susceptible to various modifications and alternative forms, specific embodiments will be described in detail herein. However, the exemplary embodiments described herein are not intended to be limited to the particular forms disclosed. Rather, the instant disclosure covers all modifications, equivalents, and alternatives falling within this disclosure.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 10 is an illustration of an additional exemplary graphical user interface that efficiently delivers and/or presents network information.

FIG. 11 is an illustration of an additional exemplary graphical user interface that efficiently delivers and/or presents network information.

Figure 1:
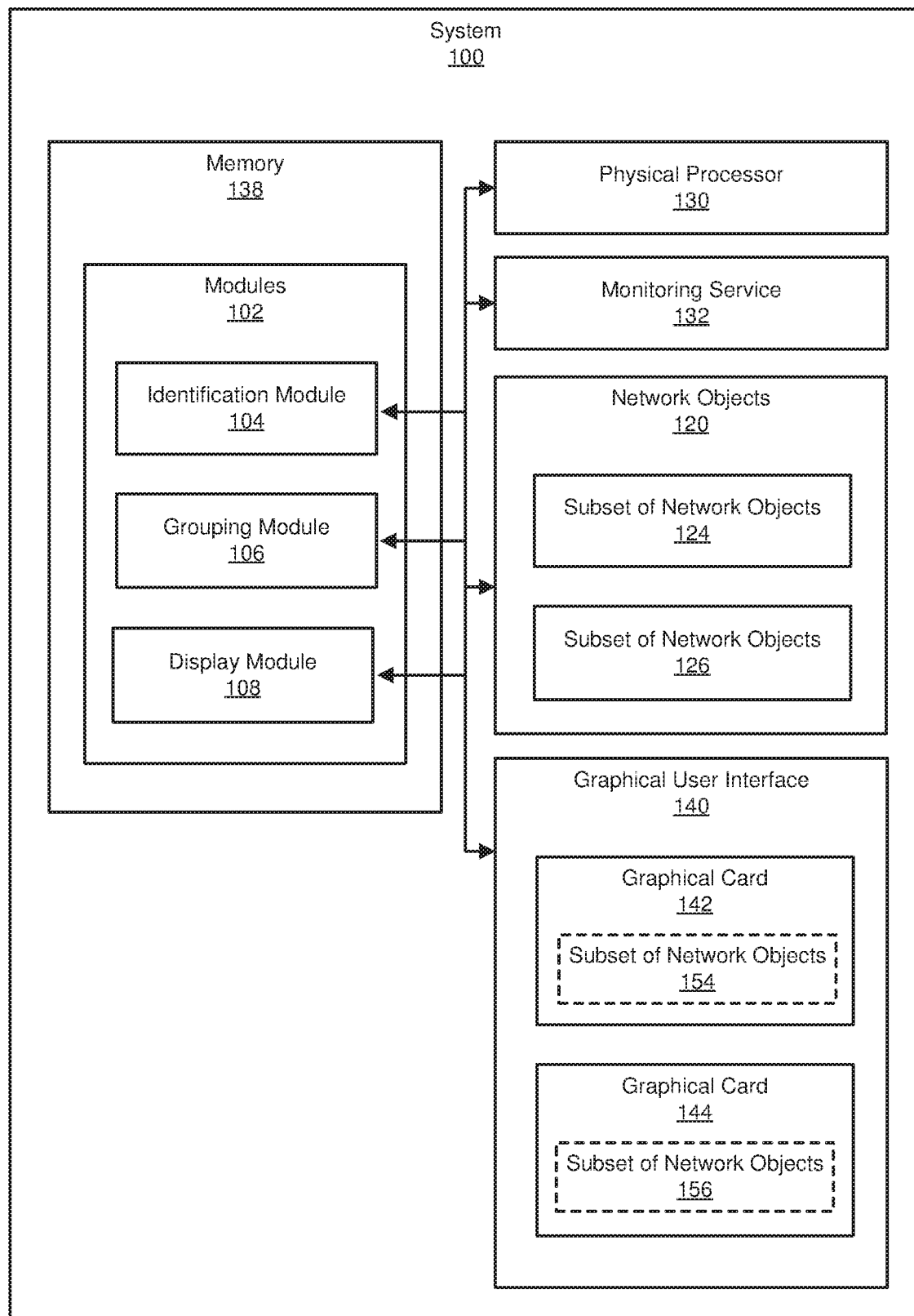
FIG. 1 is a block diagram of an exemplary system for efficient delivery and presentation of network information.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As detailed above, the instant disclosure generally relates to systems and methods for efficient delivery and presentation of network information. The instant disclosure may provide and/or facilitate efficient delivery and presentation of network information in a variety of ways. In one example, the disclosed embodiments may provide and/or facilitate a single view of SD-WAN performance for a particular site (e.g., site applications, site links, and/or overall status) to facilitate detecting and/or easily identifying network issues, bottlenecks, and/or weak links. In this example, the single view of the SD-WAN performance may constitute and/or represent a Graphical User Interface (GUI) and/or layout that provides a comprehensive overview of applications running in the network. Once administrators or decision engines have selected a specific site, an SLA performance page corresponding to the selected site may render and/or display the statuses of business-critical applications across (1) all departments (e.g., finance, human resources, etc.) associated with the site, (2) all network parameters (e.g., throughput, latency, packet loss, and jitter), and/or (3) each SLA profile and/or traffic type profile associated with the applications.

In one example, the single view of the SD-WAN performance may show and/or indicate application statuses by low performance, medium performance, and/or high performance across certain network parameters. Additionally or alternatively, the single view of the SD-WAN performance may show and/or indicate the number links on the site and/or their service performance statuses across certain network parameters (such as packet loss, jitter, and/or round trip time).

In one example, the single view of the SD-WAN performance may show and/or display three cards. In this example, the top of the single view of the SD-WAN performance may include a dropdown filter to select a site name, a time period, and/or a graph view for display. The first card below the filter may include and/or represent a bar graph that shows the overall site SLA performance. The second card may include and/or represent a custom designed scatterplot that shows the SLA performance of applications on the site. The third card may show and/or display the performance levels of individual site links.

In some examples, the disclosed embodiments may enable the single view of the SD-WAN performance to provide and/or facilitate certain customization and/or expansion features. For example, the single view of the SD-WAN performance may include and/or implement a feature through which an administrator or a decision engine is able to hover over application icons to display a tooltip with more data and/or graphs about those applications. In this example, the top of the second card may include multiple dropdown filters for selecting and/or modifying how the information is displayed. Additionally or alternatively, the third card may show and/or display a summary bar and/or line graphs illustrating the performances of different link properties.

In one example, the single view of the SD-WAN performance may show and/or display all dimensions of SLA performance. In this example, because all the dimensions of SLA performance are shown and/or displayed in the single view, an administrator or a decision engine may be able to easily scan, monitor, and/or identify any problem areas. Accordingly, the single view of the SD-WAN performance may simplify and/or improve upon previous solutions and/or approaches that involve and/or rely primarily on data tables and/or separate screens for the different pieces of information.

In one example, the single view of the SD-WAN performance may enable service providers and/or their customers to save time and/or money by enabling the administrator and/or a decision engine to detect and/or identify issues across all areas on one screen. For example, the single view of the SD-WAN performance may simultaneously show and/or display the specific time, the specific link, and/or the specific type of traffic for the corresponding application. As a result, the administrator and/or decision engine may be able to resolve and/or fix issues faster. Additionally or alternatively, the single view of the SD-WAN performance may avoid the complexity of multiple screens conventionally used to consume and/or analyze the full picture of SLA performance.

In some examples, the single view of the SD-WAN performance may combine various user interface elements laid out for display in a unified view of performance. Examples of such user interface elements include, without limitation, cards, filters, tooltips, and/or data graphs, combinations and/or variations of one or more of the same, and/or any other suitable user interface elements.

In one example, the disclosed embodiments may provide and/or facilitate a single view of SLA performance across all the customers and/or tenants of a service provider. In this example, the single view of SLA performance may include and/or represent a card layout. At the top, the layout may include a filter to change the time period, view options, search options, and/or other options. The rest of the single view of the SLA performance may be divided into two sections that expand and/or collapse. The top section may show and/or display the number of customers and/or tenants with low SLA performance for the selected time period. Additionally or alternatively, the bottom section may show and/or display the number of customers and/or tenants with high SLA performance for the selected time period.

In some examples, each customer and/or tenant card may include and/or identify (1) the name of the customer and/or tenant, (2) the number of sites for the customer and/or tenant, (3) the icon for SLA status severity, (4) the number of sites with low performance, (5) the number of sites with unsatisfied and/or unmet SLAs, (6) the duration of unsatisfied and/or unmet SLAs, and/or (7) the total number of sessions for the customer and/or tenant. In such examples, the bottom right corner of each card may include and/or provide a "continue" link that overlays additional information on the card. Examples of such additional information includes, without limitation, session durations, session switch counts, total customer and/or tenant traffic, the total number of transmitted and/or received bytes, combinations or variations of one or more of the same, and/or any other suitable information.

In some examples, the single view of SLA performance may show and/or display any number of customer and/or tenant cards. In such examples, each card may include and/or incorporate different icons with colors schemes that represent different severity levels of SLA performance. The single view of SLA performance may show and/or display customer and/or tenant performance data in connection with any network-related applications. Accordingly, the single view of SLA performance may constitute and/or represent one screen that summarizes the SLA performance data for all network customers and/or tenants.

In one example, the one screen may combine user interface elements (such as cards and icons) that create a unique interactive layout for monitoring tenant SLA performance. In this example, the one screen may constitute and/or represent a simple visual solution and/or layout that shows an overview of SLA performance. The card visualization interface may enable an administrator and/or a decision engine to monitor SLA performance across customers and/or tenants simpler, more intuitive, and/or faster.

In one example, the disclosed embodiments may provide and/or facilitate a single view of SD-WAN link performance for a particular site. In this example, the single view of the SD-WAN link performance may show and/or display a comprehensive overview of links between hub and spoke sites of a network. The left side of the single view of the SD-WAN link performance may show and/or display the site connection topology. Once administrators have selected a specific site, the single view of the SD-WAN link performance may include and/or provide information about the statuses of all links associated with the selected site. Examples of such information include, without limitation, all network parameters (such as throughput, latency, packet loss, and jitter) presented in a summary bar, link data for top applications presented in a bar chart, link utilization data presented in a donut chart, link metrics by throughput area charts for each link, profile switch events that occurred between applications, link sources and destinations, customer and/or tenant sessions, combinations or variations of one or more of the same, and/or any other suitable information.

In some examples, the single view of the SD-WAN link performance may show and/or display the link performance levels across all network parameters. For example, the single view of the SD-WAN link performance may include and/or identify the number of links on the site and/or their respective service performance statuses. In one example, the single view of the SD-WAN link performance may constitute and/or represent one screen that includes certain graphs and/or layouts. In this example, the one screen may show and/or display site link data in connection with any network-related applications. In one example, the one screen may show and/or display all dimensions of site link performance visually and/or interactively. Accordingly, the one screen may include and/or provide an interactive topology that facilitates the selection of specific site links.

In some examples, the single view of the SD-WAN link performance may combine various user interface elements laid out for display in a unified view of performance. Examples of such user interface elements include, without limitation, cards, filters, tooltips, and/or data graphs, combinations and/or variations of one or more of the same, and/or any other suitable user interface elements. The single view of the SD-WAN link performance may enable an administrator and/or a decision engine to monitor SD-WAN link performance in a simpler, more intuitive, and/or faster way.

Figure 2:
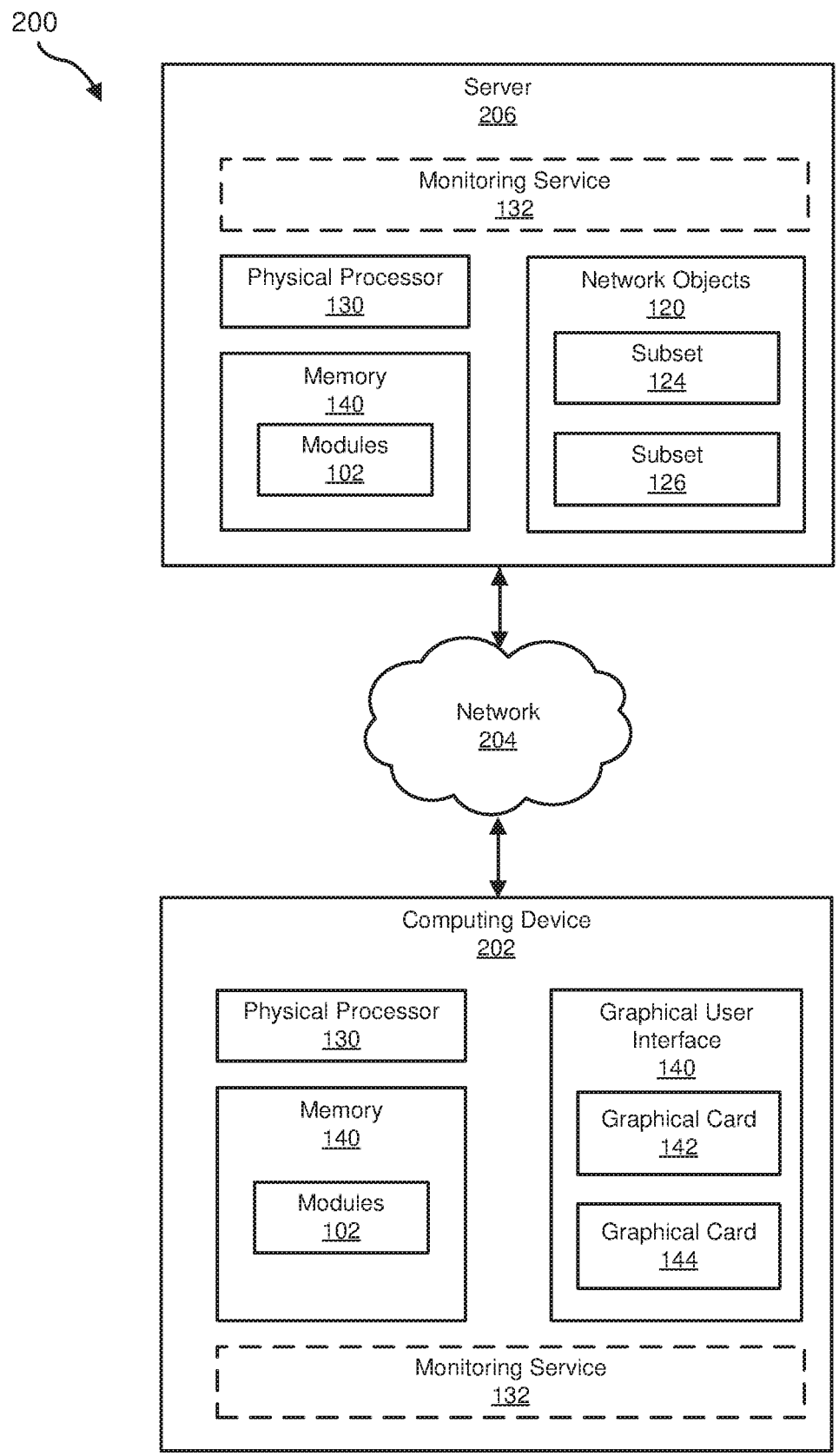
FIG. 2 is a block diagram of an additional exemplary system for efficient delivery and presentation of network information.

The following will provide, with reference to FIGS. 1 and 2 detailed descriptions of exemplary systems and corresponding implementations for efficient delivery and presentation of network information. Detailed descriptions of exemplary graphical user interfaces and/or views of the same will be provided in connection with FIGS. 4-11. Detailed descriptions of computer-implemented methods for efficient delivery and presentation of network information will be provided in connection with FIG. 3. In addition, detailed descriptions of an exemplary computing system for carrying out these methods will be provided in connection with FIG. 12.

FIG. 1 shows an exemplary system 100 that facilitates efficient delivery and presentation of network information. As illustrated in FIG. 1, system 100 may include one or more modules 102 for performing one or more tasks. As will be explained in greater detail below, modules 102 may include an identification module 104, a grouping module 106, and a display module 108. Although illustrated as separate elements, one or more of modules 102 in FIG. 1 may represent portions of a single module, application (e.g., monitoring service 132 in FIG. 1), and/or operating system.

In certain embodiments, one or more of modules 102 in FIG. 1 may represent one or more software applications or programs that, when executed by a processor of a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, exemplary system 100 may also include one or more memory devices, such as memory 138. Memory 138 generally represents any type or form of volatile or non-volatile storage device or medium capable of storing data and/or computer-readable instructions. In one example, memory 138 may store, load, and/or maintain one or more of modules 102. Examples of memory 138 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 138. Additionally or alternatively, physical processor 130 may execute one or more of modules 102 to facilitate efficient delivery and presentation of network information. Examples of physical processor 130 include, without limitation, Central Processing Units (CPUs), microprocessors, microcontrollers, Field-Programmable Gate Arrays (FPGAs) that implement softcore processors, Application-Specific Integrated Circuits (ASICs), Systems on a Chip (SoCs), portions of one or more of the same, variations or combinations of one or more of the same, and/or any other suitable physical processor.

As illustrated in FIG. 1, exemplary system 100 may further include, deploy, and/or execute one or more monitoring services, such as monitoring service 132. In some examples, monitoring service 132 may include and/or represent an application and/or software program that monitors certain network activities, behaviors, and/or events in connection with a tenant and/or customer of a network and/or service provider. Additionally or alternatively, monitoring service 132 may collect data and/or information about the performance of certain applications, services, and/or network features associated with the tenant and/or customer of the network and/or service provider. Further, monitoring service 132 may facilitate displaying and/or presenting such data and/or information to an administrator and/or analyst associated with or employed by the tenant and/or customer of the network and/or service provider. In one example, monitoring service 132 may include and/or represent a distributed software application that executes and/or deploys one or more of modules 102.

As illustrated in FIG. 1, exemplary system 100 may additionally include, track, and/or record one or more network objects, such as network objects 120. In some examples, network objects 120 may include and/or represent any type or form of data, information, and/or statistics associated with the performance and/or health of certain network features and/or sites associated with a tenant and/or customer of a network and/or service provider.

Examples of network objects 120 include, without limitation, data representative of applications associated with a specific site, data indicating the performance levels of applications associated with a specific site, data representative of links associated with a specific site, metrics of links associated with a specific site, performance levels of certain links across network parameters, data representative of an overall status or health of a specific site, the statuses or health of all departments associated with a specific site, all network parameters tracked in connection with monitoring service 132, each Service Level Agreement (SLA) associated with a specific site, each traffic type associated with a specific site, tenant or customer names, the total number of sites associated with a tenant or customer, overall SLA performance levels of a tenant or customer, the number of low-performing sites associated with a tenant or customer, the number of underperforming sites that are not currently satisfying at least one SLA of a tenant or customer, the durations that underperforming sites have failed to satisfy the SLA of a tenant or customer, the total number of communication sessions associated with a tenant or customer, SLA network objects associated with high-performing or low-performing tenants tracked in connection with monitoring service 132, data associated with a plurality of links between hub sites and spoke sites of a network, data representative of a site-connection topology of a network, variations or combinations of one or more of the same, and/or any other suitable network objects.

As illustrated in FIG. 1, exemplary system 100 may additionally include, group, and/or store one or more subsets of network objects, such as subset 124 and/or subset 126. In some examples, subset 124 may include and/or represent a grouping of one or more, but less than all, of network objects 120. Additionally or alternatively, subset 126 may include and/or represent another grouping of one or more, but less than all, of network objects 120. In one example, subsets 124 and 126 may be mutually exclusive with one another such that none of the network objects are included in both of subsets 124 and 126. In another example, subsets 124 and 126 may overlap with one another to some degree such that one or more of the network objects are included in both of subsets 124 and 126.

As illustrated in FIG. 1, exemplary system 100 may also include, deploy, and/or execute one or more graphical user interfaces, such as graphical user interface 140. In some examples, graphical user interface 140 may be shown, displayed, and/or presented on a computing device and/or monitor for viewing by a user, an administrator, and/or an analyst. In one example, graphical user interface 140 may include and/or incorporate one or more graphical cards, such as graphical cards 142 and 144. In this example, graphical card 142 may include and/or graphically represent subset of network objects 124 and/or be positioned in a certain section of graphical user interface 140. Additionally or alternatively, graphical card 144 may include and/or graphically represent subset of network objects 126 and/or be positioned in a different section of graphical user interface 140.

In some examples, system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication among computing device 202 and/or server 206. In some examples, and as will be described in greater detail below, one or more of modules 102 may cause computing device 202 and/or server 206 to (1) identify set of network objects 120 associated with network 204 whose performance is tracked by monitoring service 132, (2) group subset of network objects 124 together based at least in part on a first attribute shared in common by subset of network objects 124, (3) group subset of network objects 126 together based at least in part on a second attribute shared in common by subset of network objects 126, and then (4) provide, for presentation on computing device 202 or another computing system in connection with monitoring service 132, graphical user interface 140 that includes a plurality of graphical cards in a single view. In such examples, the plurality of graphical cards may include at least (A) graphical card 142 that is positioned in a first section of graphical user interface 140 in the single view and graphically represents subset of network objects 124 grouped based at least in part on the first attribute and (B) graphical card 144 that is positioned in a second section of graphical user interface 140 in the single view and graphically represents subset of network objects 126 grouped based at least in part on the second attribute.

In some examples, computing device 202 may each generally represent any type or form of physical computing device capable of reading computer-executable instructions. In one example, computing device 202 may include and/or be communicatively coupled to a display and/or monitor. In this example, computing device 202 may be able to display and/or present graphical user interfaces and/or images for viewing by a user, an administrator, and/or an analyst. Examples of computing device 202 include, without limitation, routers (such as provider edge routers, hub routers, spoke routers, autonomous system boundary routers, and/or area border routers), switches, hubs, modems, bridges, repeaters, gateways (such as broadband network gateways), multiplexers, network adapters, network interfaces, client devices, laptops, tablets, desktops, servers, cellular phones, Personal Digital Assistants (PDAs), multimedia players, embedded systems, wearable devices, gaming consoles, displays, monitors, variations or combinations of one or more of the same, and/or any other suitable computing devices.

In some examples, server 206 may generally represent any type or form of computing device capable of grouping subsets of network objects based on certain attributes and/or providing graphical user interfaces for presentation on computing devices. Examples of server 206 include, without limitation, security servers, monitoring servers, application servers, web servers, storage servers, and/or database servers configured to run certain software applications and/or provide various security, monitoring, web, storage, and/or database services.

In some examples, network 204 may generally represent any medium or architecture capable of facilitating communication or data transfer. In one example, network 204 may include and/or incorporate computing device 202 and/or server 206 even though these devices are illustrated as being external to network 204 in FIG. 2. Additionally or alternatively, network 204 may include and/or incorporate other devices (not necessarily illustrated in FIG. 2) associated with one or more tenants and/or customers of a service provider and/or monitoring service 132. Network 204 may facilitate communication or data transfer using wireless and/or wired connections. Examples of network 204 include, without limitation, an intranet, an access network, a layer 2 network, a layer 3 network, a MPLS network, an Internet Protocol (IP) network, a heterogeneous network (e.g., layer 2, layer 3, IP, and/or MPLS) network, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
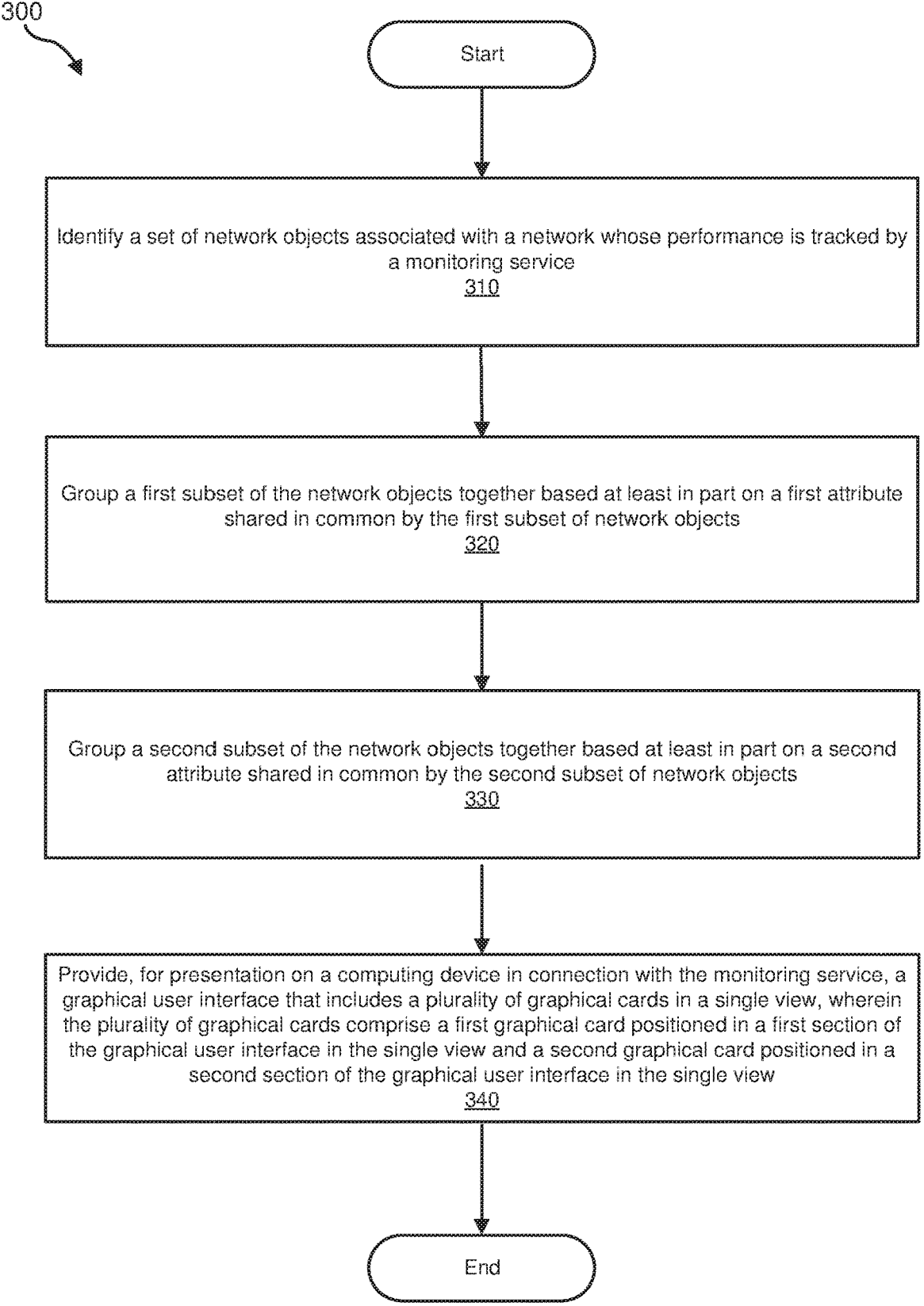
FIG. 3 is a flow diagram of an exemplary method for predicting future traffic loads of outgoing interfaces on network devices.
Figure 4:
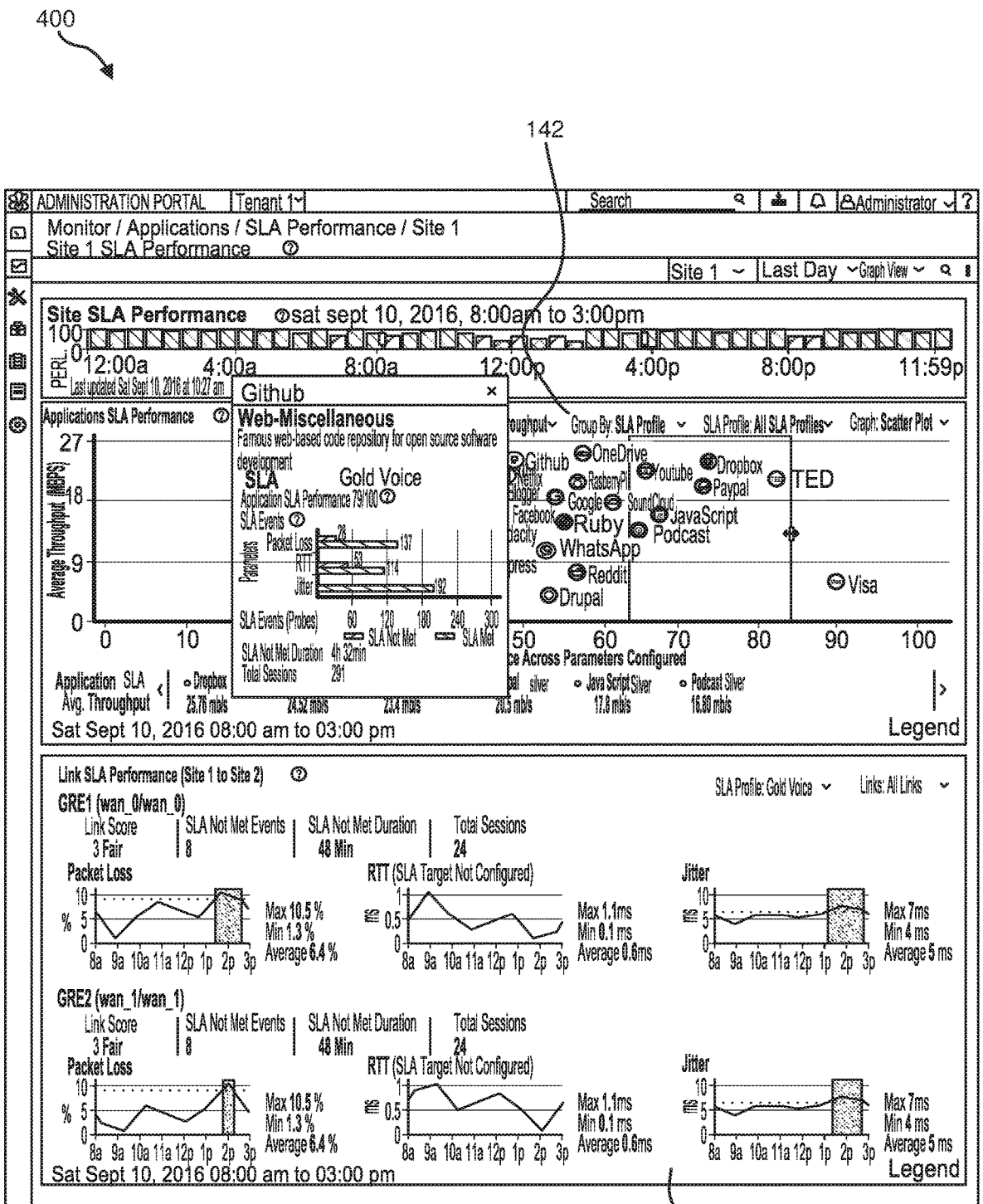
FIG. 4 is an illustration of an exemplary graphical user interface that efficiently delivers and/or presents network information.
Figure 5:
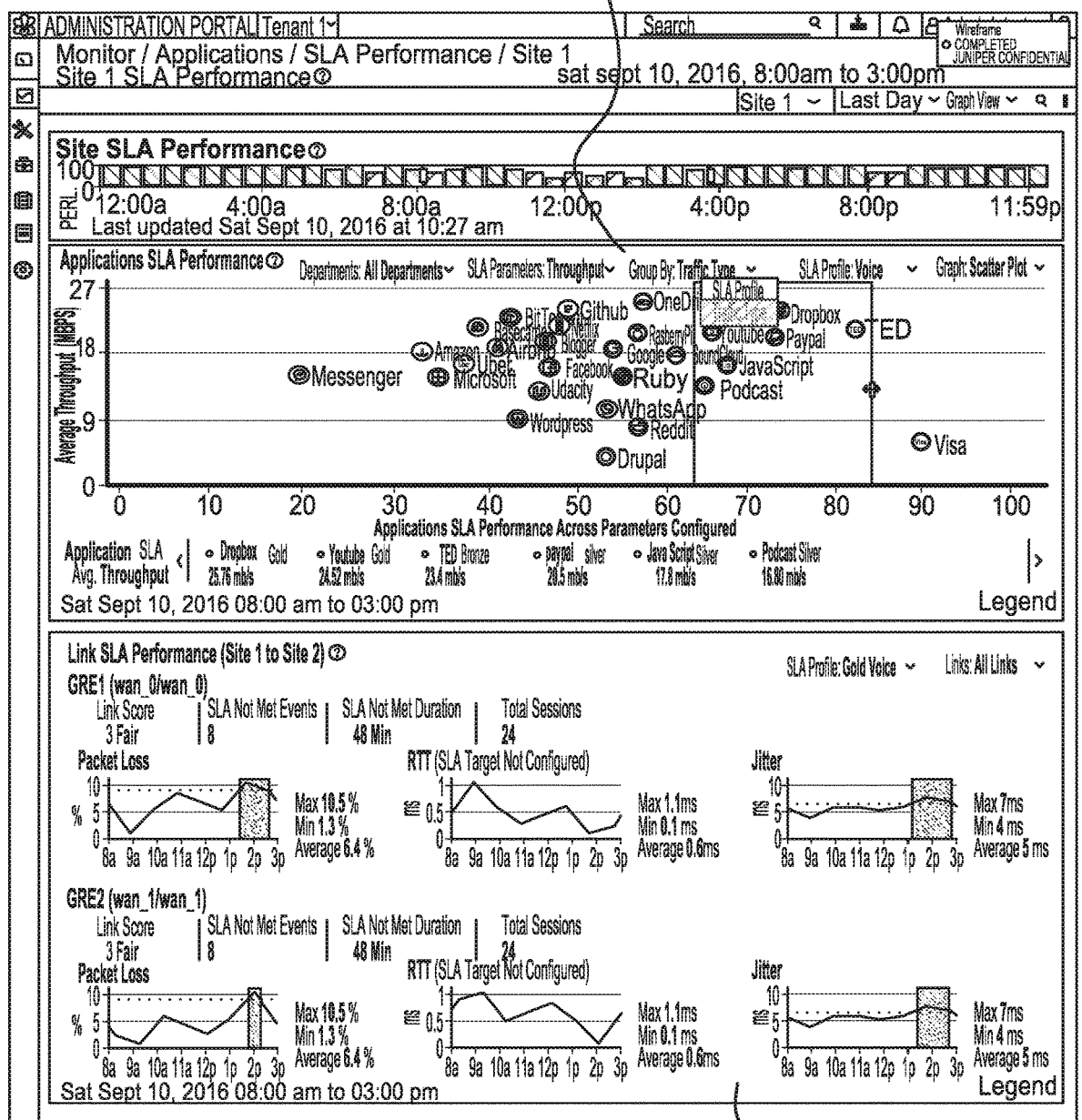
FIG. 5 is an illustration of an additional exemplary graphical user interface that efficiently delivers and/or presents network information.
Figure 6:
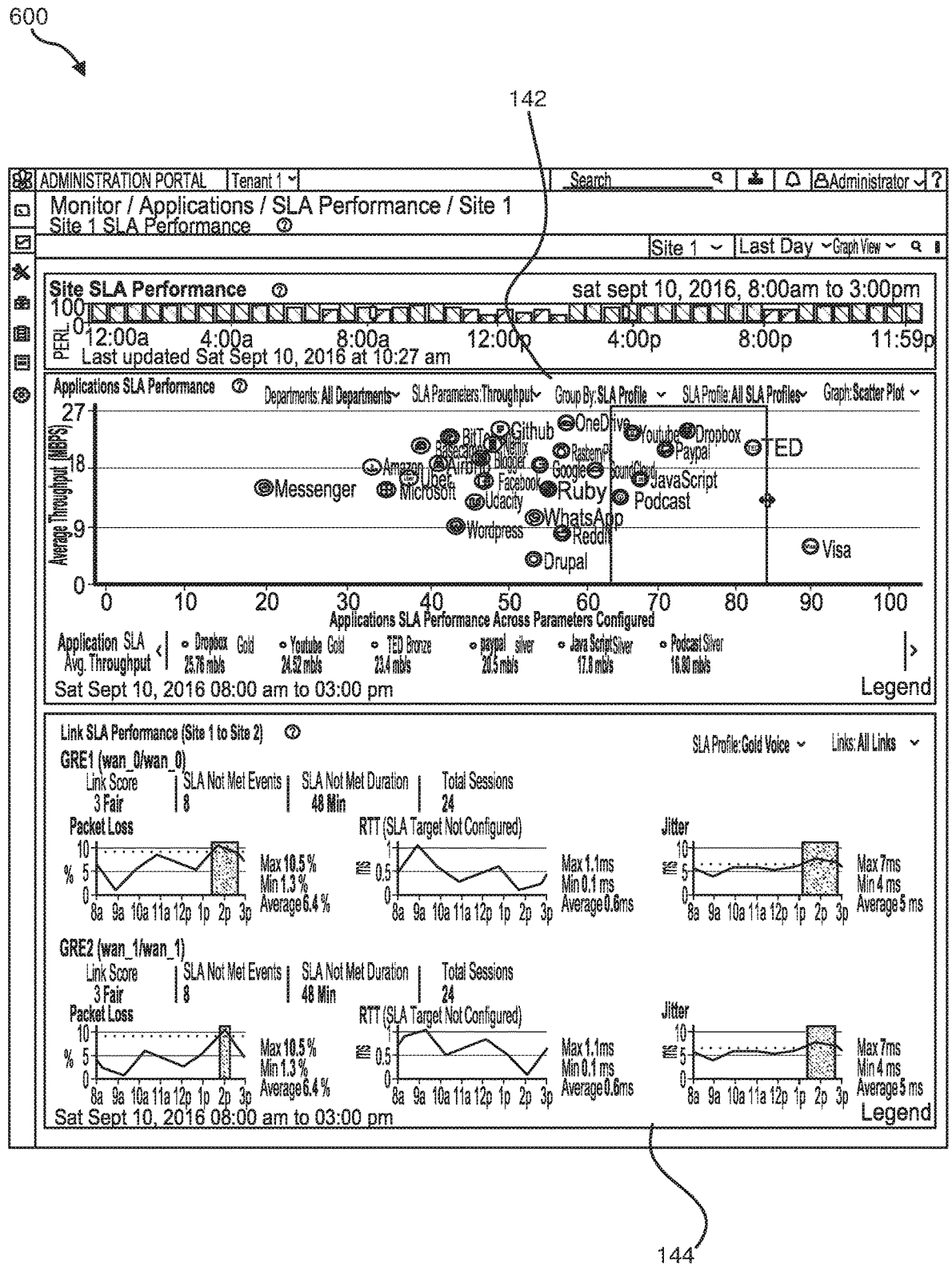
FIG. 6 is an illustration of an additional exemplary graphical user interface that efficiently delivers and/or presents network information.
Figure 7:
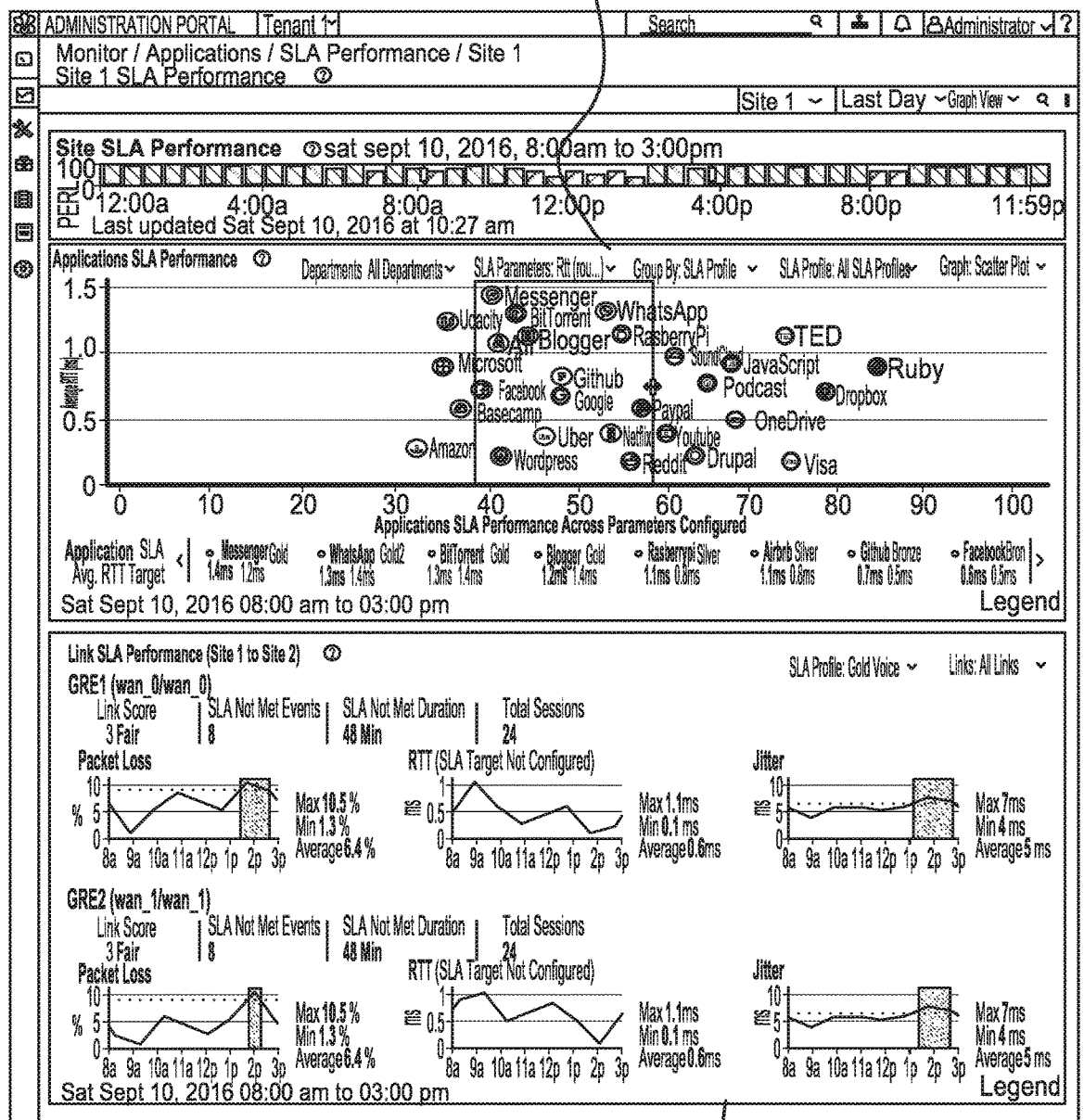
FIG. 7 is an illustration of an additional exemplary graphical user interface that efficiently delivers and/or presents network information.

FIG. 3 is a flow diagram of an exemplary computer-implemented method 300 for predicting future traffic loads of outgoing interfaces on network devices. The steps shown in FIG. 3 may be performed by any suitable computer-executable code and/or computing system, including system 100 in FIG. 1, system 200 in FIG. 2, system 1200 in FIG. 10, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify a set of network objects associated with a network whose performance is tracked by a monitoring service. For example, identification module 104 may, as part of computing device 202 and/or server 206 in FIG. 2, identify a set of network objects 120 associated with network 204 whose performance is tracked by monitoring service 132. In one example, network objects 120 may be selected by and/or be of particular interest to one or more tenants and/or customers of a service provider and/or monitoring service 132.

The systems described herein may perform step 310 in a variety of ways and/or contexts. In some examples, identification module 104 may monitor certain portions of network 204 and/or related computing devices for network objects associated with or of interest to one or more tenants or customers of a service provider and/or monitoring service 132. While monitoring those portions of network 204 and/or related computing devices in this way, identification module 104 may detect and/or identify certain network objects that match and/or satisfy certain criteria. In one example, identification module 104 may store and/or record those network objects in a database and/or catalog associated with one or more tenants or customers of the service provider and/or monitoring service 132.

As illustrated in FIG. 3, at step 320 one or more of the systems described herein may group a first subset of network objects together based at least in part on a first attribute shared in common by the first subset of network objects. For example, grouping module 106 may, as part of computing device 202 and/or server 206 in FIG. 2, group subset of network objects 124 together based at least in part on one or more attributes shared in common by subset of network objects 124. Examples of the attributes shared in common by subset of network objects 124 include, without limitation, a specific tenant or customer, a specific site of a tenant or customer, a specific department of a tenant or customer, a specific application used by a tenant or customer, a certain performance level of applications used by a tenant or customer, a specific link associated with a tenant or customer, a specific time period, a specific communication session associated with a tenant or customer, variations or combinations of one or more of the same, and/or any other suitable attributes.

The systems described herein may perform step 320 in a variety of ways and/or contexts. In some examples, grouping module 106 may tag subset of network objects 124 in one way or another to indicate that those network objects are included in subset 124 and/or have certain attributes in common. In one example, grouping module 106 may store and/or maintain subset of network objects 124 in a certain directory and/or area of memory dedicated to or reserved for network objects that share those attributes in common.

As illustrated in FIG. 3, at step 330 one or more of the systems described herein may group a second subset of network objects together based at least in part on a second attribute shared in common by the first subset of network objects. For example, grouping module 106 may, as part of computing device 202 and/or server 206 in FIG. 2, group subset of network objects 126 together based at least in part on one or more attributes shared in common by subset of network objects 126. Examples of the attributes shared in common by subset of network objects 126 include, without limitation, a specific tenant or customer, a specific site of a tenant or customer, a specific department of a tenant or customer, a specific application used by a tenant or customer, a certain performance level of applications used by a tenant or customer, a specific link associated with a tenant or customer, a specific time period, a specific communication session associated with a tenant or customer, variations or combinations of one or more of the same, and/or any other suitable attributes.

The systems described herein may perform step 330 in a variety of ways and/or contexts. In some examples, grouping module 106 may tag subset of network objects 126 in one way or another to indicate that those network objects are included in subset 126 and/or have certain attributes in common. In one example, grouping module 106 may store and/or maintain subset of network objects 126 in a certain directory and/or area of memory dedicated to or reserved for network objects that share those attributes in common.

In some examples, one or more of the attributes used to group subset of network objects 124 together may differ from one or more of the attributes used to group subset of network objects 126 together. For example, grouping module 106 may group subset of network objects 124 together because all those network objects are associated with a first tenant or customer of a service provider and/or monitoring service 132. In this example, grouping module 106 may group subset of network objects 126 together because all those network objects are associated with a second tenant or customer of a service provider and/or monitoring service 132.

In some examples, network objects 120 may include and/or represent certain data indicating performance levels of applications associated with a specific site. In one example, grouping module 106 may group subset 124 to include certain network objects associated with one or more applications that are achieving a certain performance level (e.g., a high performance level or a low performance level). In this example, grouping module 106 may group subset 126 to include certain network objects associated with one or more applications that are achieving a different performance level (e.g., a high performance level or a low performance level).

In some examples, network objects 120 may include and/or represent certain network objects associated with a first tenant tracked in connection with monitoring service 132 and/or other network objects associated with a second tenant tracked in connection with monitoring service 132. In one example, grouping module 106 may group subset 124 to include all those network objects associated with the first tenant. In this example, grouping module 106 may group subset 126 to include all those network objects associated with the second tenant.

In some examples, network objects 120 may include and/or represent certain SLA network objects associated with one or more high-performing tenants tracked in connection with monitoring service 132 and/or other SLA network objects associated with one or more low-performing tenants tracked in connection with monitoring service 132. In one example, grouping module 106 may group subset 124 to include all those SLA network objects associated with the high-performing tenants. In this example, grouping module 106 may group subset 126 to include all those SLA network objects associated with the low-performing tenants.

In some examples, network objects 120 may include and/or represent data associated with a plurality of links between hub sites and spoke sites of the network and/or data representative of a site-connection topology of the network. In one example, grouping module 106 may group subset 124 to include the data representative of those links. In this example, grouping module 106 may group subset 126 to include the data representative of the site-connection topology of the network.

As illustrated in FIG. 3, at step 340 one or more of the systems described herein may provide, for presentation on a computing device in connection with the monitoring service, a graphical user interface that includes a plurality of graphical cards in a single view. For example, display module 108 may, as part of computing device 202 and/or server 206 in FIG. 2, provide graphical user interface 140 for presentation on computing device 202 in connection with monitoring service 132. In this example, graphical user interface 140 may include and/or represent graphical cards 142 and 144. Graphical user interface 140 may show and/or present graphical card 142 as positioned in a first section of the single view and/or graphical card 144 as positioned in a second section of the single view.

In one example, graphical card 142 may graphically represent and/or incorporate subset of network objects 124 grouped together based at least in part on one or more attributes shared in common by subset of network objects 124. In this example, graphical card 144 may graphically represent and/or incorporate subset of network objects 126 grouped together based at least in part on one or more attributes shared in common by subset of network objects 126.

In one example, the single view of graphical user interface 140 may represent and/or constitute a perspective in which various graphical components and/or features of graphical user interface 140 are displayed and/or visible on a monitor of computing device 202 at any given time. For example, the single view of graphical user interface 140 may present and/or display graphical cards 142 and 144 simultaneously within a monitor of computing device 202 at any given time. In this example, the single view of graphical user interface 140 may present and/or display additional graphical cards, components, and/or features simultaneously within the monitor of computing device 202 at any given time.

The systems described herein may perform step 340 in a variety of ways and/or contexts. In some examples, display module 108 may direct computing device 202 to display graphical user interface 140 for viewing by a user, an administrator, and/or an analyst. In one example, display module 108 may configure and/or arrange graphical user interface 140 such that graphical card 142 is placed and/or located in one section of the single view. In this example, display module 108 may configure and/or arrange graphical user interface 140 such that graphical card 144 is placed and/or located in another section of the single view.

In one example, the sections in which graphical cards 142 and 144 are positioned may represent and/or constitute different areas of graphical user interface 140. For example, the section in which graphical card 142 is positioned may represent and/or constitute a top-side area of graphical user interface 140. In this example, the section in which graphical card 144 is positioned may represent and/or constitute a bottom-side area of graphical user interface 140. Accordingly, graphical card 142 may be positioned above graphical card 144 within the single view of graphical user interface 140.

In another example, the section in which graphical card 142 is positioned may represent and/or constitute a left-side area of graphical user interface 140. In this example, the section in which graphical card 144 is positioned may represent and/or constitute a right-side area of graphical user interface 140. Accordingly, graphical card 142 may be positioned to the left of graphical card 144 within the single view of graphical user interface 140.

In some examples, network objects 120 may include and/or represent certain metrics of the links associated with a specific site and/or the performance levels of the links across certain network parameters. In one example, grouping module 106 may group subset 124 to include the links associated with the specific site together. In this example, display module 108 may display, within the single view of graphical user interface 140, a graphical representation of the metrics of the links and/or a graphical representation of the performance levels of the links across those network parameters. Additionally or alternatively, display module 108 may provide, within the single view of graphical user interface 140, a selection feature or filter that facilitates selecting, from the links, a specific link for drilling down data associated with that link.

In some examples, network objects 120 may include and/or represent a plurality of network objects associated with a specific site. In one example, display module 108 may provide, within graphical user interface 140, at least one selection feature or filter that facilitates making a selection of the specific site, a specific time period, and/or a type of graph (such as a line graph, a pie chart, a donut graph, a bar chart, etc.) for presentation in the single view. In response to such a selection, display module 108 may modify the single view of graphical user interface 140 to conform with that selection. Additionally or alternatively, display module 108 may provide, within graphical user interface 140, a hover feature that facilitates displaying a tooltip in connection with an icon over which a cursor is hovered.

In one example, display module 108 may provide, within graphical user interface 140, a first icon of a first color scheme that indicates one severity level of SLA performance in connection with certain SLA network objects. In this example, display module 108 may provide, within graphical user interface 140, a second icon of a second color scheme that indicates another severity level of SLA performance in connection with other SLA network objects. Additionally or alternatively, display module 108 may display, within the single view of graphical user interface 140, a graphical representation that summarizes the SLA performances of both high-performing tenants and low-performing tenants.

FIGS. 4-7 are illustrations of exemplary graphical user interfaces 400, 500, 600, and 700 that efficiently deliver and/or present network information. As illustrated in FIGS. 4-7, graphical user interfaces 400, 500, 600, and 700 may each include and/or incorporate graphical cards 142 and 144 within a single view. In one example, graphical card 142 may be positioned above graphical card 144 within the single view. In this example, one or more additional graphical cards that facilitate delivering and/or presenting network information may also be positioned within the single view.

In one example, graphical user interfaces 400, 500, 600, and 700 may each provide an administrator with a single view of SD-WAN performance for a specific site to check and/or easily identify issues at that site. In this example, graphical user interfaces 400, 500, 600, and 700 may each represent and/or constitute a comprehensive overview of applications running in a network. Graphical user interfaces 400, 500, 600, and 700 may each include and/or provide a selection feature and/or filter that enables the administrator to select a specific site within the network.

In one example, graphical user interfaces 400, 500, 600, and 700 may include and/or provide information about the status of business-critical applications across (1) all departments (e.g., finance, human resources, information technology, etc.) associated with the selected site, (2) all network parameters (e.g., throughput, latency, packet loss, jitter, etc.) tracked in connection with monitoring service 132, (3) each SLA profile associated with the selected site, and/or (4) each traffic-type profile associated with the selected site.

In one example, graphical user interfaces 400, 500, 600, and 700 may include and/or incorporate various network objects associated with the selected site. Examples of such network objects include, without limitation, data representative of applications associated with the selected site, data representative of links associated with the selected site, data representative of the overall status of the selected site, variations or combinations of one or more of the same, and/or any other suitable network objects.

In one example, graphical user interfaces 400, 500, 600, and 700 may show and/or present application statuses in terms of low, medium, and/or high performance levels across the network parameters in the single view. In this example, graphical user interfaces 400, 500, 600, and 700 may also show and/or present link information, including the number of links on the selected site and/or their service performance status across three specific network parameters (e.g., packet loss, round-trip delay time, and/or jitter).

In one example, the single view of graphical user interfaces 400, 500, 600, and 700 may show and/or present a site SLA performance screen that includes three graphical cards. In this example, the top portion of the single view may include and/or provide at least one selection and/or drop-down filter that facilitates selecting a specific site, a specific time period, and/or a type of graph for presentation. Just below the top portion of the single view, one graphical card may include and/or represent a bar graph that shows the overall SLA performance of the selected site. Below that graphical card in the single view, graphical card 142 may include and/or represent a custom scatterplot that shows the SLA performance of applications running on the selected site.

Continuing this example, graphical user interfaces 400, 500, 600, and 700 may include and/or provide a hovering feature for the application icons. In one example, the hovering feature may facilitate displaying a tooltip with information and/or graphs about an application whose icon is hovered over with a cursor. In this example, the top portion of graphical card 142 may include and/or provide certain selection and/or dropdown filters that facilitate changing the information and/or features on display. The bottom portion of graphical card 142 may include and/or provide a graphical carousel that shows the statuses of individual applications running on the selected site.

In one example, the scatterplot of graphical card 142 may include and/or provide a movable and/or slidable selection filter that facilitates selecting more or less applications. In this example, the applications selected via the movable and/or slidable selection filter may influence and/or dictate which applications are represented in the graphical carousel of graphical card 142. In other words, the graphical carousel of graphical card 142 may reflect the applications selected by the movable and/or slidable selection filter included and/or provided by the scatterplot of graphical card 142.

In one example, below graphical card 142 in the single view, graphical card 144 may show and/or present the performance levels of individual links associated with the selected site. In this example, graphical card 144 may include and/or incorporate different sections that are each dedicated to a different site link. For example, graphical card 144 may include and/or incorporate a top section dedicated to a General Routing Encapsulation (GRE) link named "GRE1" and a bottom section dedicated to a GRE link named "GRE2". In this example, the top section of graphical card 144 may show and/or present a summary bar and/or line graphs that convey the performance level of "GRE1" across various link properties and/or network parameters. Similarly, the bottom section of graphical card 144 may show and/or present a summary bar and/or line graphs that convey the performance level of "GRE2" across various link properties and/or network parameters.

In some examples, graphical user interfaces 400, 500, 600, and 700 may include and/or provide all dimensions of SLA performance in one screen for simultaneous visual display. By doing so, graphical user interfaces 400, 500, 600, and 700 may enable the administrator to easily and/or conveniently scan and/or monitor data related to the selected site. Although illustrated in specific ways across FIGS. 4-7, graphical user interfaces 400, 500, 600, and 700 may alternatively change and/or modify certain features. For example, graphical user interfaces 400, 500, 600, and 700 may maintain the same layout and/or graphs but apply different performance data, information, statistics, and/or parameters to that layout and/or those graphs.

Figure 8:
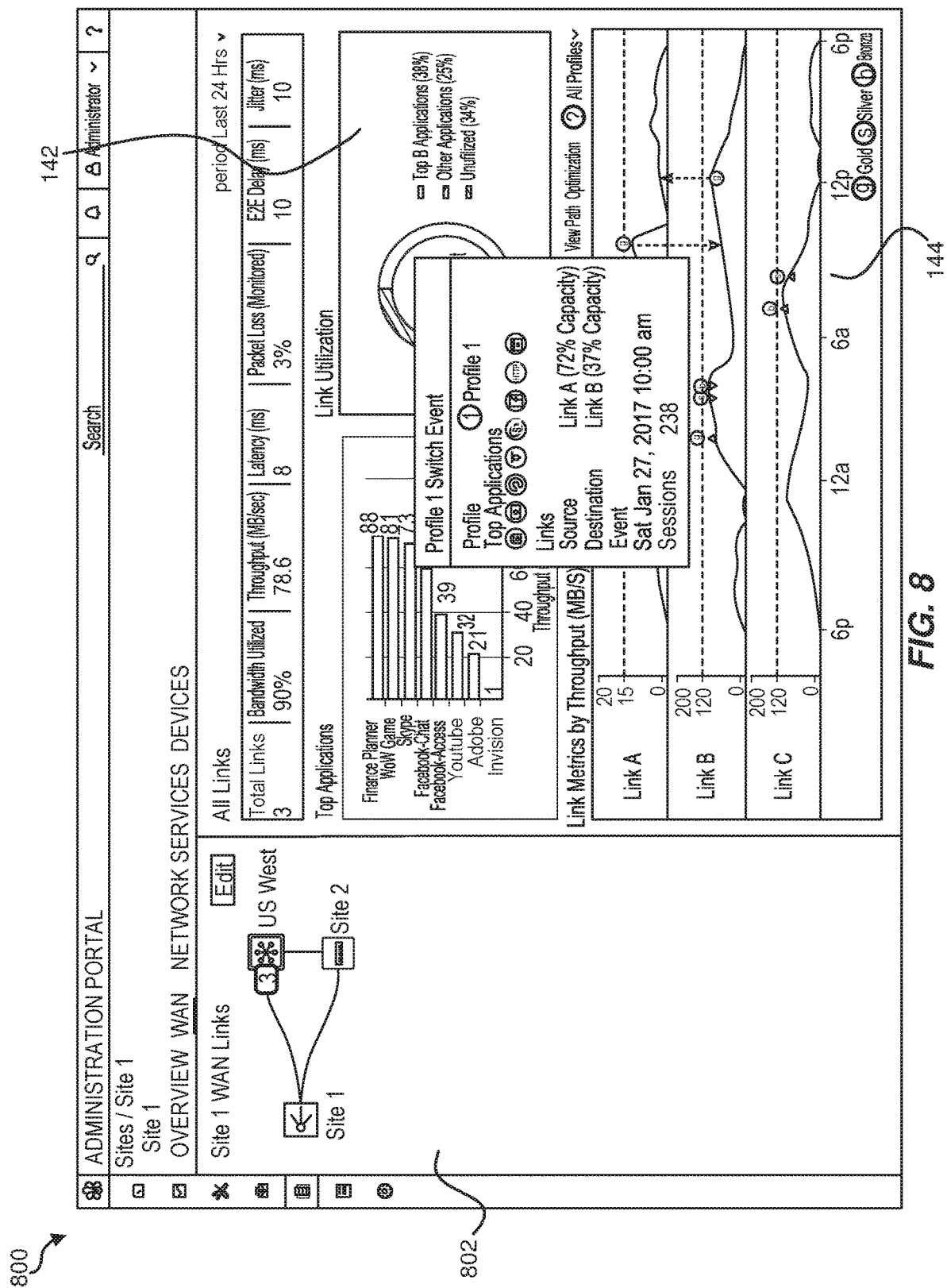
FIG. 8 is an illustration of an additional exemplary graphical user interface that efficiently delivers and/or presents network information.
Figure 9:
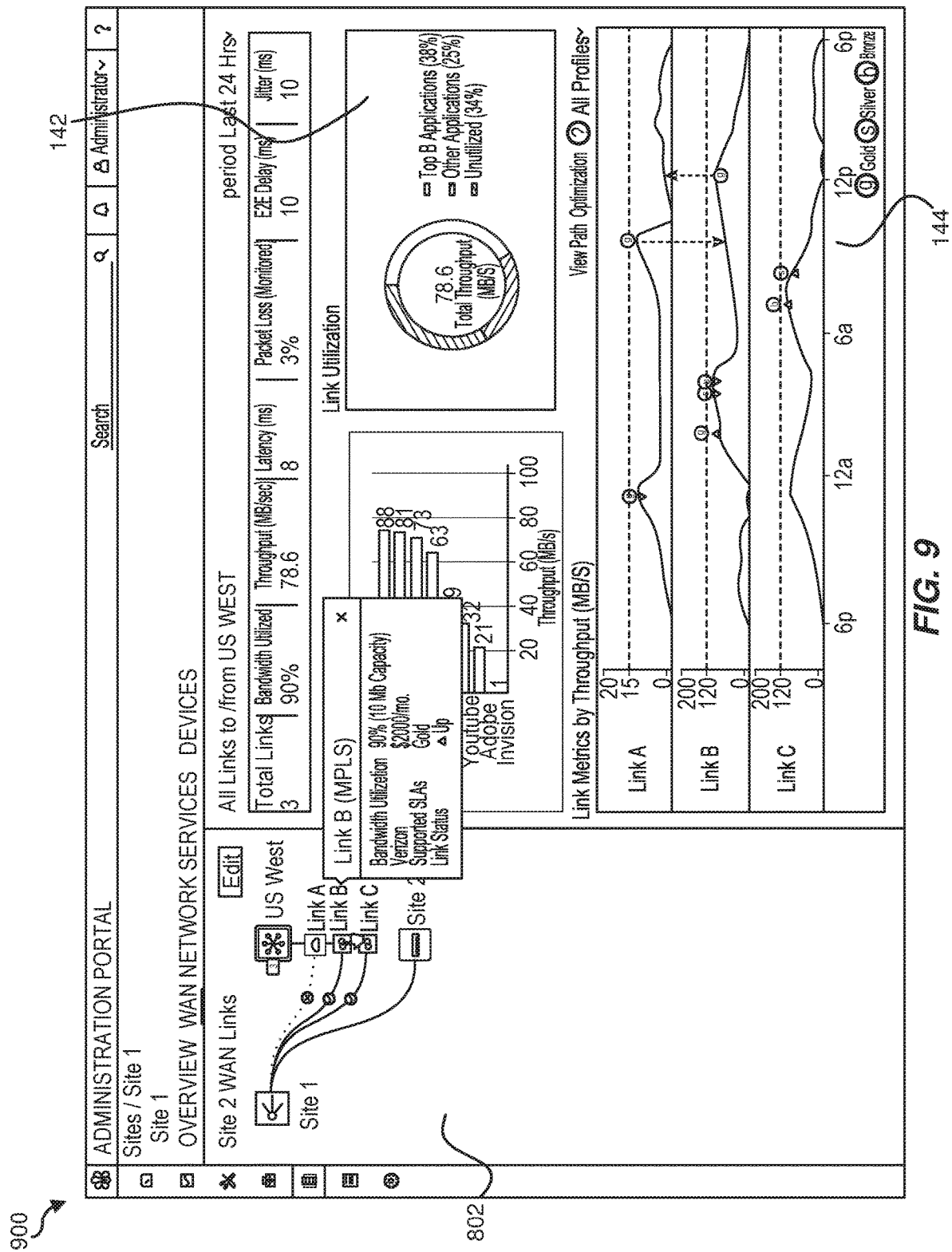
FIG. 9 is an illustration of an additional exemplary graphical user interface that efficiently delivers and/or presents network information.

FIGS. 8 and 9 are illustrations of exemplary graphical user interfaces 800 and 900 that efficiently deliver and/or present network information. As illustrated in FIGS. 8 and 9, graphical user interfaces 800 and 900 may each include and/or incorporate graphical cards 142 and 144 within a single view. In one example, graphical card 142 may be positioned above graphical card 144 within the single view. In this example, one or more additional graphical cards that facilitate delivering and/or presenting network information may also be positioned within the single view.

In one example, graphical user interfaces 800 and 900 may each be configured and/or arranged with a layout that provides a comprehensive overview of links between hub and spoke sites within a network. In this example, the left side of graphical user interfaces 800 and 900 may show and/or present a graphical representation of a site-connection topology 802 of the network. Graphical user interfaces 800 and 900 may enable an administrator to select a specific site from site-connection topology 802.

Once the administrator has selected the specific site, graphical user interfaces 800 and 900 may provide information about the statuses of all the links and/or connections across (1) all network parameters (e.g., throughput, latency, packet loss, jitter, etc.) associated with the selected site, (2) the top applications associated with the selected site, (3) the link utilization of the selected site, (4) the link-throughput metrics of the selected site. In one example, the network parameters may be shown and/or presented in a summary bar at the top of the right side of graphical user interfaces 800 and 900. In this example, the top applications may be shown and/or presented in a bar chart below the summary bar on the right side of graphical user interfaces 800 and 900. Further, the link utilization of the selected site may be shown and/or presented in a donut graph and/or pie chart below the summary bar on the right side of graphical user interfaces 800 and 900. Finally, the link-throughput metrics of the selected site may be shown and/or presented below the bar chart and the donut or pie chart on the right side of graphical user interfaces 800 and 900.

In one example, graphical user interfaces 800 and 900 may indicate and/or display the number of links associated with the selected site. Additionally or alternatively, graphical user interfaces 800 and 900 may indicate and/or display the service performance statuses of the links associated with the selected site.

Continuing this example, graphical user interfaces 800 and 900 may include and/or provide a hovering feature for switch event icons. In one example, the hovering feature may facilitate displaying a tooltip with information and/or graphs about a switch event (e.g., profiles, top applications, link sources and destinations, and/or sessions) whose icon is hovered over with a cursor.

In one example, graphical user interfaces 800 and 900 may each be deployed to show and/or present site link data in any network-related application. Additionally or alternatively, graphical user interfaces 800 and 900 may each include and/or provide all dimensions of link performance in one screen for simultaneous visual display, link modification or adjustment, and/or interactive link selection. By doing so, graphical user interfaces 800 and 900 may enable the administrator to easily and/or conveniently scan and/or monitor data related to problematic links and/or bottlenecks within the site and/or the network at large in a single view or screen. Although illustrated in specific ways across FIGS. 8 and 9, graphical user interfaces 800 and 900 may alternatively change and/or modify certain features. For example, graphical user interfaces 800 and 900 may maintain the same layout and/or graphs but apply different performance data, information, statistics, and/or parameters to that layout and/or those graphs.

Figure 10:
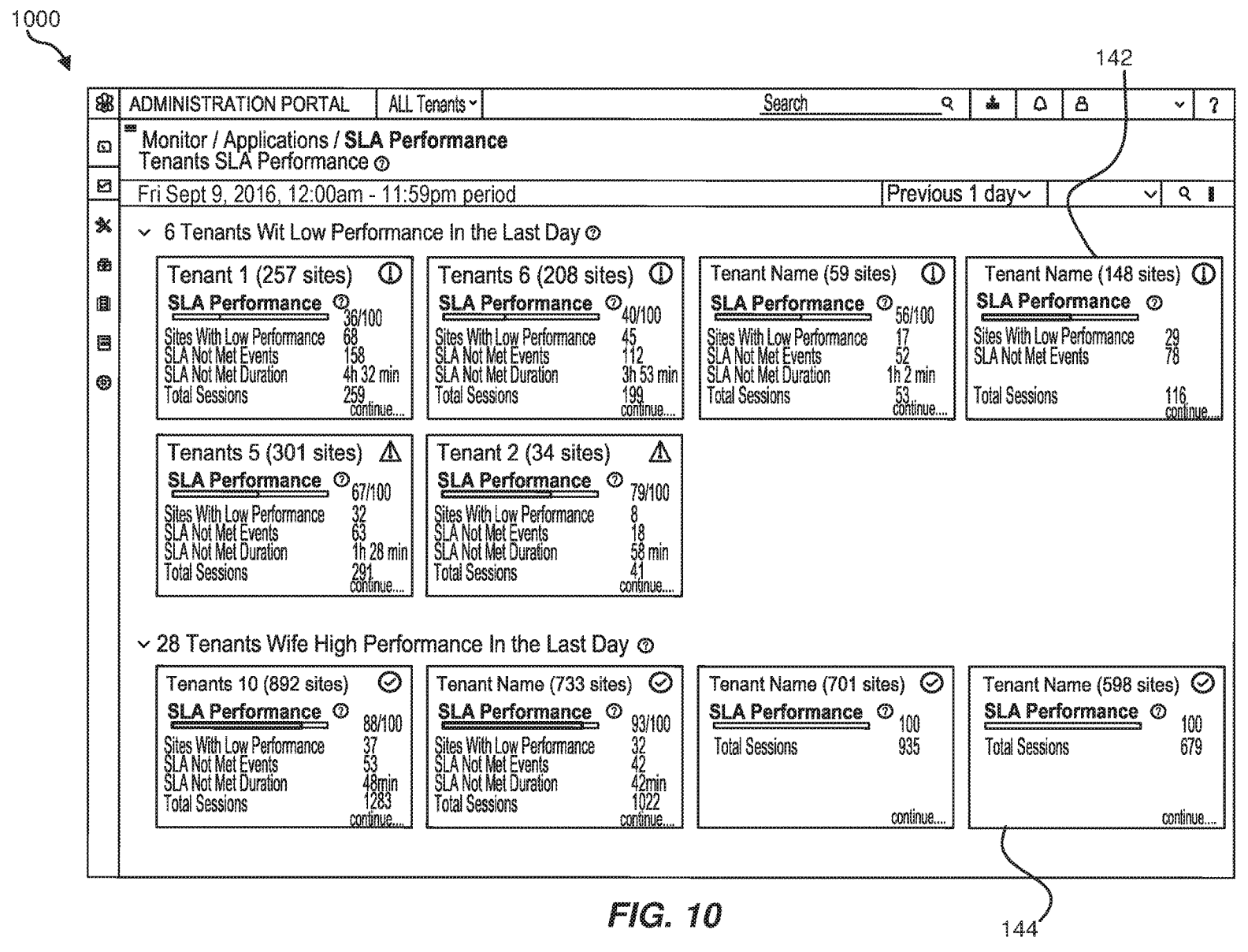
Figure 11:
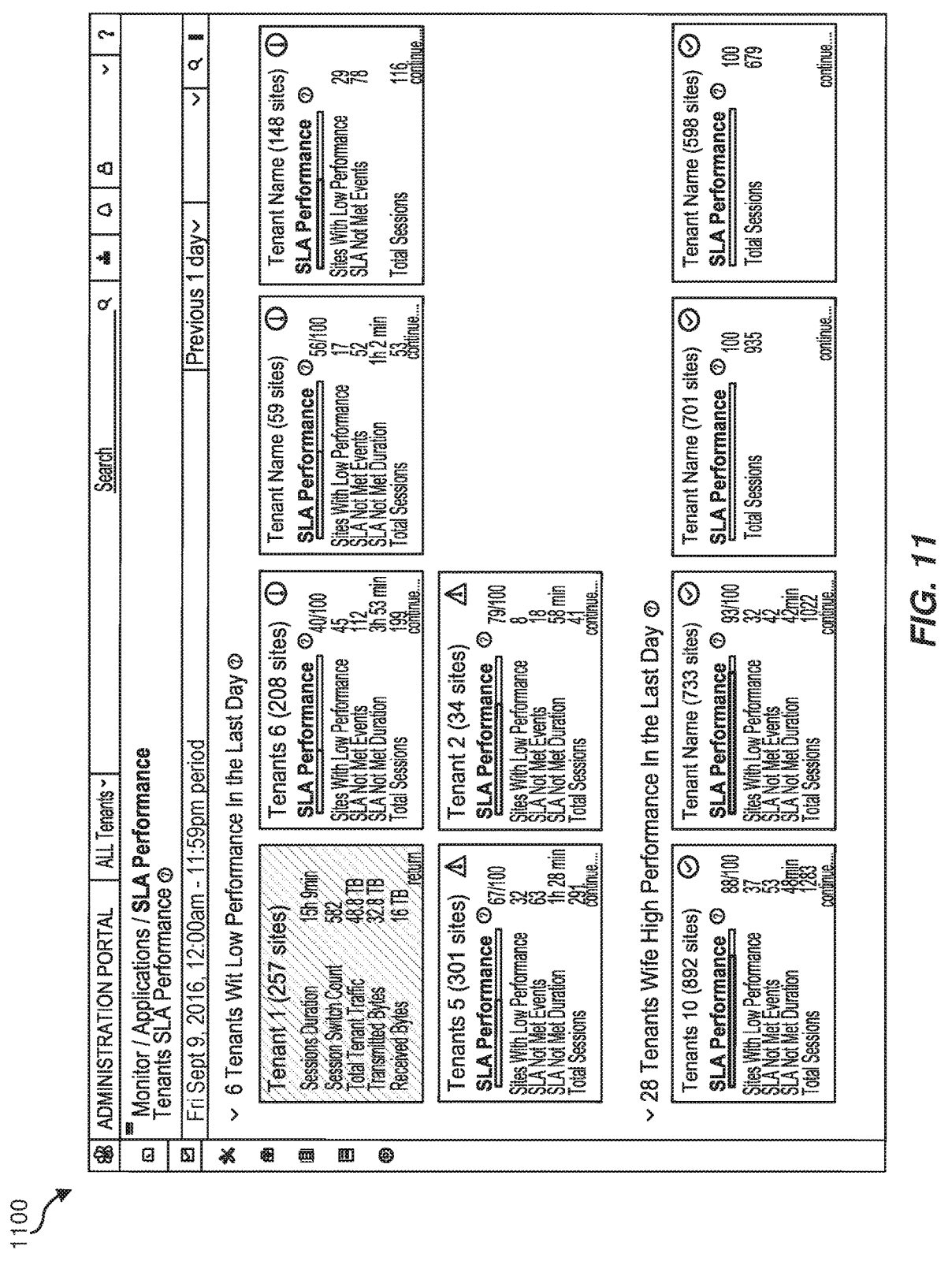

FIGS. 10 and 11 are illustrations of exemplary graphical user interfaces 1000 and 1100 that efficiently deliver and/or present network information. As illustrated in FIGS. 10 and 11, graphical user interfaces 1000 and 1100 may each include and/or incorporate graphical cards 142 and 144 within a single view. In one example, graphical card 142 may be positioned above graphical card 144 within the single view. In this example, one or more additional graphical cards that facilitate delivering and/or presenting network information may also be positioned within the single view.

In one example, graphical user interfaces 1000 and 1100 may each be configured and/or arranged with a layout that provides a comprehensive overview of SLA performance across all tenants and/or customers of a network and/or service provider in a single view. In this example, the top portion of graphical user interfaces 1000 and 1100 may show and/or present a graphical representation of all those tenants and/or customers whose SLA performance is above a certain threshold. This top portion of graphical user interfaces 1000 and 1100 may each include a set of graphical cards, including graphical card 142, that correspond to and/or represent those tenants and/or customers with low SLA performance over the last day.

Continuing with this example, the bottom portion of graphical user interfaces 1000 and 1100 may show and/or present a graphical representation of all those tenants and/or customers whose SLA performance is below a certain threshold. This bottom portion of graphical user interfaces 1000 and 1100 may each include a set of graphical cards, including graphical card 144, that correspond to and/or represent those tenants and/or customers with high SLA performance over the last day.

In some examples, graphical user interfaces 1000 and 1100 may each include and/or provide a selection feature or filter at the top of the single view or screen. In one example, the selection filter or filter may enable the administrator to change and/or modify the time period, view, search, and/or other options on display in the single view or screen. In this example, each graphical tenant card may include and/or provide various tenant-specific information. Examples of such tenant-specific information include, without limitation, the tenant's name, the number of sites associated with that tenant, an icon indicating the tenant's SLA status severity, the tenant's SLA performance bar and/or number, the number of the tenant's sites with low performance, the number of the tenant's sites with high performance, the number of the tenant's underperforming sites that are not currently satisfying at least one SLA of the tenant, the durations that such underperforming sites have failed to satisfy the tenant's SLA(s), the total number of communication sessions associated with the tenant, variations or combinations of one or more of the same, and/or any other suitable tenant-specific information.

In one example, each graphical tenant card may include and/or provide a "continue" link that overlays and/or leads to additional information in connection with the tenant in question. Examples of such additional tenant information includes, without limitation, the durations of the tenant's communication sessions, the switch counts of the tenant's communication sessions, the total amount of tenant traffic, the total amount of transmitted bytes in connection with the tenant's traffic, the total amount of received bytes in connection with the tenant's traffic, variations or combinations of one or more of the same, and/or any other suitable tenant information.

In some examples, graphical user interfaces 1000 and 1100 may each include and/or provide any number of tenant cards in a single view or screen. In one example, some tenant cards may show and/or present certain data or features that differ from other tenant cards. For example, one tenant card may show and/or present one icon and/or color scheme for a certain SLA severity, while another card may show and/or present another icon and/or color scheme for the same SLA severity.

In one example, graphical user interfaces 1000 and 1100 may be able to show and/or present tenant SLA performance in any network-related application. In this example, graphical user interfaces 1000 and 1100 may summarize tenant SLA performance data for all tenants in a single view or screen. This single view or screen may constitute and/or represent a unique visual layout that indicates the SLA statuses for all tenants in the network.

Additionally or alternatively, graphical user interfaces 1000 and 1100 may each include and/or provide all dimensions of tenant SLA performance in one screen for simultaneous visual display and/or interactive tenant selection. By doing so, graphical user interfaces 1000 and 1100 may enable the administrator to easily and/or conveniently scan and/or monitor data related to tenants with problematic SLA performance and those with good SLA performance in a single view or screen. As a result, graphical user interfaces 1000 and 1100 may facilitate simpler, cheaper, and/or more intuitive monitoring of SLA performance across the tenants of the network. Although illustrated in specific ways across FIGS. 10 and 11, graphical user interfaces 1000 and 1100 may alternatively change and/or modify certain features. For example, graphical user interfaces 1000 and 1100 may maintain the same layout and/or graphs but apply different performance data, information, statistics, and/or parameters to that layout and/or those graphs.

Figure 12:
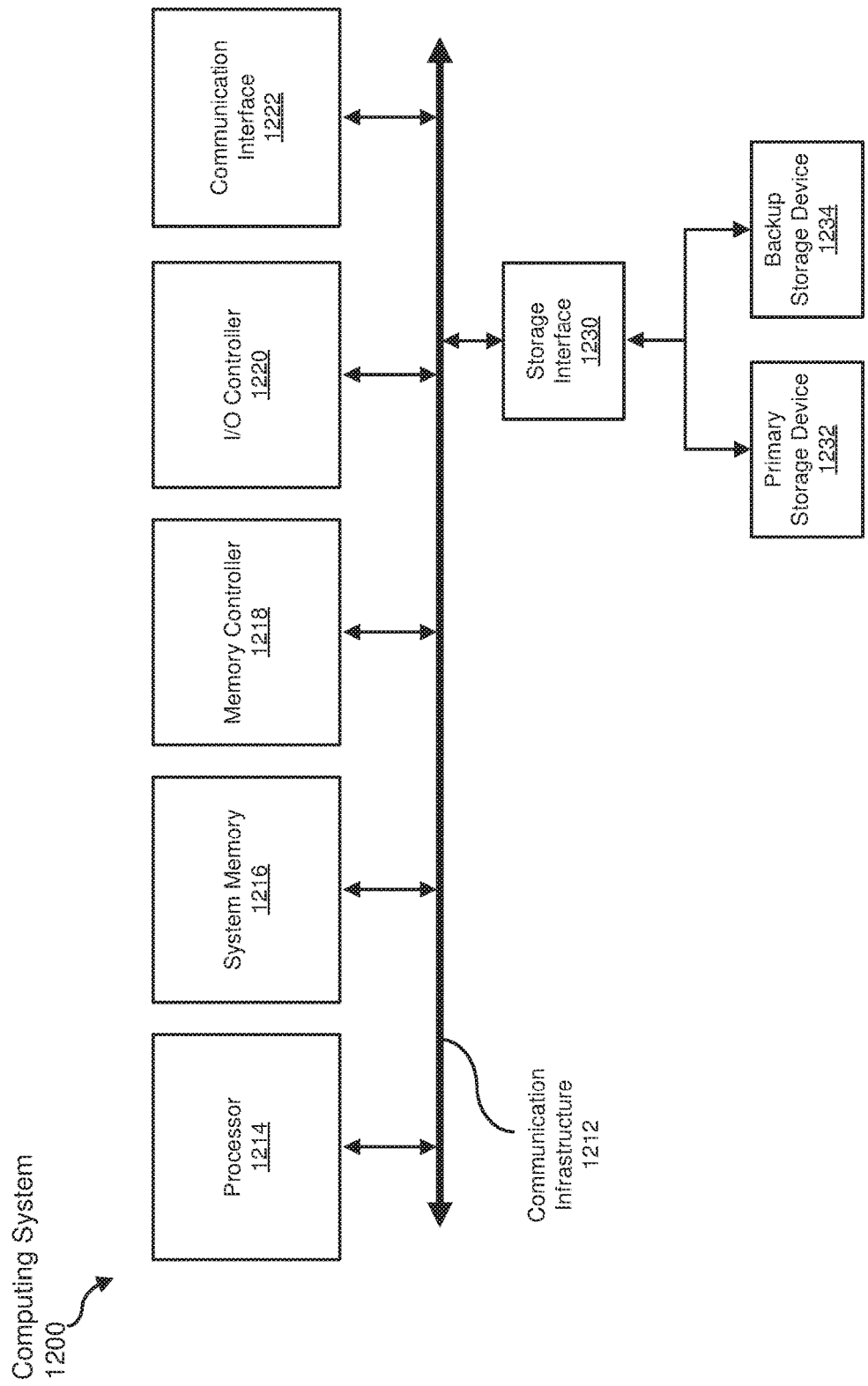
FIG. 12 is a block diagram of an exemplary computing system capable of implementing and/or being used in connection with one or more of the embodiments described and/or illustrated herein.

FIG. 12 is a block diagram of an exemplary computing system 1200 capable of implementing and/or being used in connection with one or more of the embodiments described and/or illustrated herein. In some embodiments, all or a portion of computing system 1200 may perform and/or be a means for performing, either alone or in combination with other elements, one or more of the steps described in connection with FIG. 3. All or a portion of computing system 1200 may also perform and/or be a means for performing and/or implementing any other steps, methods, or processes described and/or illustrated herein.

Computing system 1200 broadly represents any type or form of electrical load, including a single or multi-processor computing device or system capable of executing computer-readable instructions. Examples of computing system 1200 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1200 may be programmed, configured, and/or otherwise designed to comply with one or more networking protocols. According to certain embodiments, computing system 1200 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1200 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1200 may include various network and/or computing components. For example, computing system 1200 may include at least one processor 1214 and a system memory 1216. Processor 1214 generally represents any type or form of processing unit capable of processing data or interpreting and executing instructions. For example, processor 1214 may represent an ASIC, a system on a chip (e.g., a network processor), a hardware accelerator, a general purpose processor, and/or any other suitable processing element.

Processor 1214 may process data according to one or more of the networking protocols discussed above. For example, processor 1214 may execute or implement a portion of a protocol stack, may process packets, may perform memory operations (e.g., queuing packets for later processing), may execute end-user applications, and/or may perform any other processing tasks.

System memory 1216 generally represents any type or form of volatile or non-volatile storage device or medium capable of storing data and/or other computer-readable instructions. Examples of system memory 1216 include, without limitation, Random Access Memory (RAM), Read Only Memory (ROM), flash memory, or any other suitable memory device. Although not required, in certain embodiments computing system 1200 may include both a volatile memory unit (such as, for example, system memory 1216) and a non-volatile storage device (such as, for example, primary storage device 1232, as described in detail below). System memory 1216 may be implemented as shared memory and/or distributed memory in a network device. Furthermore, system memory 1216 may store packets and/or other information used in networking operations.

In certain embodiments, exemplary computing system 1200 may also include one or more components or elements in addition to processor 1214 and system memory 1216. For example, as illustrated in FIG. 12, computing system 1200 may include a memory controller 1218, an Input/Output (I/O) controller 1220, and a communication interface 1222, each of which may be interconnected via communication infrastructure 1212. Communication infrastructure 1212 generally represents any type or form of infrastructure capable of facilitating communication between one or more components of a computing device. Examples of communication infrastructure 1212 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1218 generally represents any type or form of device capable of handling memory or data or controlling communication between one or more components of computing system 1200. For example, in certain embodiments memory controller 1218 may control communication between processor 1214, system memory 1216, and 1/O controller 1220 via communication infrastructure 1212. In some embodiments, memory controller 1218 may include a Direct Memory Access (DMA) unit that may transfer data (e.g., packets) to or from a link adapter.

I/O controller 1220 generally represents any type or form of device or module capable of coordinating and/or controlling the input and output functions of a computing device. For example, in certain embodiments I/O controller 1220 may control or facilitate transfer of data between one or more elements of computing system 1200, such as processor 1214, system memory 1216, communication interface 1222, and storage interface 1230.

Communication interface 1222 broadly represents any type or form of communication device or adapter capable of facilitating communication between exemplary computing system 1200 and one or more additional devices. For example, in certain embodiments communication interface 1222 may facilitate communication between computing system 1200 and a private or public network including additional computing systems. Examples of communication interface 1222 include, without limitation, a link adapter, a wired network interface (such as a network interface card), a wireless network interface (such as a wireless network interface card), and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1222 may also represent a host adapter configured to facilitate communication between computing system 1200 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1222 may also enable computing system 1200 to engage in distributed or remote computing. For example, communication interface 1222 may receive instructions from a remote device or send instructions to a remote device for execution.

As illustrated in FIG. 12, exemplary computing system 1200 may also include a primary storage device 1232 and/or a backup storage device 1234 coupled to communication infrastructure 1212 via a storage interface 1230. Storage devices 1232 and 1234 generally represent any type or form of storage device or medium capable of storing data and/or other computer-readable instructions. For example, storage devices 1232 and 1234 may represent a magnetic disk drive (e.g., a so-called hard drive), a solid state drive, a floppy disk drive, a magnetic tape drive, an optical disk drive, a flash drive, or the like. Storage interface 1230 generally represents any type or form of interface or device for transferring data between storage devices 1232 and 1234 and other components of computing system 1200.

In certain embodiments, storage devices 1232 and 1234 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1234 may also include other similar structures or devices for allowing computer software, data, or other computer-readable instructions to be loaded into computing system 1200. For example, storage devices 1232 and 1234 may be configured to read and write software, data, or other computer-readable information. Storage devices 1232 and 1234 may be a part of computing system 1200 or may be separate devices accessed through other interface systems.

Many other devices or subsystems may be connected to computing system 1200. Conversely, all of the components and devices illustrated in FIG. 12 need not be present to practice the embodiments described and/or illustrated herein. The devices and subsystems referenced above may also be interconnected in different ways from those shown in FIG. 12. Computing system 1200 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying a set of network objects associated with a network whose performance is tracked by a monitoring service;
   grouping a first subset of the network objects together based at least in part on the first subset of network objects being related to a performance level of a specific site;
   grouping a second subset of the network objects together based at least in part on the second subset of network objects being related to performance levels of applications associated with the specific site;
   grouping a third subset of the network objects together based at least in part on the third subset of network objects being related to performance levels of network connections between hub and spoke sites within the network; and
   providing, for presentation on a computing device in connection with the monitoring service, a graphical user interface that includes a plurality of graphical cards in a single view, wherein the plurality of graphical cards comprise at least:
     a first graphical card that is positioned in a first section of the graphical user interface in the single view and graphically represents the first subset of network objects;
     a second graphical card that is positioned in a second section of the graphical user interface in the single view and graphically represents the second subset of network objects, wherein the second graphical card comprises:
       a graphical carousel that shows statuses of a subset of the applications associated with the specific site;
       a scatterplot that shows data points representative of the performance levels of the applications associated with the specific site; and
       a movable selection filter that overlays the scatterplot and facilitates selecting, from the data points by sliding over the scatterplot, the subset of applications whose statuses are shown in the graphical carousel; and
     a third graphical card that is positioned in a third section of the graphical user interface in the single view and graphically represents the third subset of network objects.

2. The method of claim 1, wherein the set of network objects comprises statuses of business-critical applications across:
   all departments associated with the specific site;
   all network parameters tracked in connection with the monitoring service;

each Service Level Agreement (SLA) associated with the specific site; and each traffic type associated with the specific site.

3. The method of claim 1, wherein:
grouping the first subset of the network objects together comprises grouping, based at least in part on data representative of the performance levels of the applications, network objects associated with a first plurality of the applications that are achieving a certain performance level; and grouping the second subset of the network objects together grouping, based at least in part on the data representative of the performance levels of the applications, additional network objects associated with a second plurality of the applications that are achieving an additional performance level.

4. The method of claim 1, wherein:
the set of network objects comprises at least one of:
metrics of the network connections between the hub and spoke sites within the network; and
performance levels of the network connections across certain network parameters;

grouping the first subset of the network objects together comprises grouping the network connections between the hub and spoke sites within the network together as the first subset of the network objects; and providing the graphical user interface for presentation on the computing device in connection with the monitoring service comprises displaying, within the single view of the graphical user interface, at least one of:
a graphical representation of the metrics of the network connections; and
a graphical representation of the performance levels of the network connections across the certain network parameters.

5. The method of claim 4, wherein providing the graphical user interface for presentation on the computing device in connection with the monitoring service comprises providing, within the graphical user interface, a selection feature that facilitates selecting, from the network connections, a specific network connection for drilling down data associated with the specific network connection.

6. The method of claim 1, wherein:
providing the graphical user interface for presentation on the computing device in connection with the monitoring service comprises providing, within the graphical user interface, at least one selection filter that facilitates making a selection of at least one of:
the specific site;
a specific time period; and
a type of graph for presentation in the single view; and
modifying the single view of the graphical user interface to conform with the selection made via the selection filter.

7. The method of claim 6, wherein the type of graph for presentation in the single view comprises at least one of:
a line graph;
a pie chart;
a donut graph; and
a bar chart.

8. The method of claim 1, wherein providing the graphical user interface for presentation on the computing device in connection with the monitoring service comprises providing, within the graphical user interface, a hover feature that facilitates displaying a tooltip in connection with an icon over which a cursor is hovered.

9. The method of claim 1, wherein:
the set of network objects associated with the network comprise at least one of:
network objects associated with a first tenant tracked in connection with the monitoring service; and
additional network objects associated with a second tenant tracked in connection with the monitoring service; and further comprising:
grouping the network objects associated with the first tenant together; and
grouping the additional network objects associated with the second tenant together.

10. The method of claim 9, wherein the network objects associated with the first tenant identify:
a name of the first tenant;
a total number of sites associated with the first tenant;
an overall SLA performance level of the first tenant;
a number of low-performing sites associated with the first tenant;
a number of underperforming sites that are not currently satisfying at least one SLA of the first tenant;
one or more durations that the underperforming sites have failed to satisfy the SLA of the first tenant; and
a total number of communication sessions associated with the first tenant.

11. The method of claim 1, wherein:
the set of network objects associated with the network comprise at least one of:
SLA network objects associated with one or more high-performing tenants tracked in connection with the monitoring service; and
additional SLA network objects associated with one or more low-performing tenants tracked in connection with the monitoring service; and further comprising:
grouping the SLA network objects associated with the high-performing tenants together; and
grouping the additional SLA network objects associated with the low-performing tenants together.

12. The method of claim 11, wherein providing the graphical user interface for presentation on the computing device in connection with the monitoring service comprises:
providing, within the graphical user interface, a first icon of a first color scheme that indicates a first severity level of SLA performance in connection with the SLA network objects; and
providing, within the graphical user interface, a second icon of a second color scheme that indicates a second severity level of SLA performance in connection with the additional SLA network objects.

13. The method of claim 12, wherein providing the graphical user interface for presentation on the computing device in connection with the monitoring service comprises displaying, within the single view of the graphical user interface, a graphical representation that summarizes SLA performances of the high-performing tenants and the low-performing tenants.

14. The method of claim 1, wherein the set of network objects associated with the network comprise at least one of:
data associated with the network connections between the hub and spoke sites within the network; and
data representative of a site-connection topology of the network; and further comprising:
grouping the data associated with the network connections together; and
grouping the data representative of the site-connection topology of the network together.

15. The method of claim 14, wherein:

the first section of the graphical user interface is located on a right side of the graphical user interface; and the second section of the graphical user interface is located on a left side of the graphical user interface.

16. A system comprising:

an identification module, stored in memory, that identifies a set of network objects associated with a network whose performance is tracked by a monitoring service;

a grouping module, stored in memory, that:
- groups a first subset of the network objects together based at least in part on the first subset of network objects being related to a performance level of a specific site;
- groups a second subset of the network objects together based at least in part on the second subset of network objects being related to performance levels of applications associated with the specific site; and
- groups a third subset of the network objects together based at least in part on the third subset of network objects being related to performance levels of network connections between hub and spoke sites within the network a display module, stored in memory, that provides, for presentation on a computing device in connection with the monitoring service, a graphical user interface that includes a plurality of graphical cards in a single view, wherein the plurality of graphical cards comprise at least:
- a first graphical card that is positioned in a first section of the graphical user interface in the single view and graphically represents the first subset of network objects;
- a second graphical card that is positioned in a second section of the graphical user interface in the single view and graphically represents the second subset of network objects, wherein the second graphical card comprises:
  - a graphical carousel that shows statuses of a subset of the applications associated with the specific site;
  - a scatterplot that shows data points representative of the performance levels of the applications associated with the specific site; and
  - a movable selection filter that overlays the scatterplot and facilitates selecting, from the data points by sliding over the scatterplot, the subset of applications whose statuses are shown in the graphical carousel; and
- a third graphical card that is positioned in a third section of the graphical user interface in the single view and graphically represents the third subset of network objects; and at least one physical processor that executes the identification module, the grouping module, and the display module.

17. The system of claim 16, wherein the set of network objects comprises statuses of business-critical applications across:
- all departments associated with the specific site;
- all network parameters tracked in connection with the monitoring service;
- each Service Level Agreement (SLA) associated with the specific site; and
- each traffic type associated with the specific site.

18. A non-transitory computer-readable medium comprising one or more computer-executable instructions that, when executed by at least one processor of a computing device, cause the computing device to:
- identify a set of network objects associated with a network whose performance is tracked by a monitoring service;
- group a first subset of the network objects together based at least in part on the first subset of network objects being related to a performance level of a specific site;
- group a second subset of the network objects together based at least in part on the second subset of network objects being related to performance levels of applications associated with the specific site;
- group a third subset of the network objects together based at least in part on the third subset of network objects being related to performance levels of network connections between hub and spoke sites within the network; and
- provide, for presentation in connection with the monitoring service, a graphical user interface that includes a plurality of graphical cards in a single view, wherein the plurality of graphical cards comprise at least:
  - a first graphical card that is positioned in a first section of the graphical user interface in the single view and graphically represents the first subset of network objects;
  - a second graphical card that is positioned in a second section of the graphical user interface in the single view and graphically represents the second subset of network objects,
  wherein the second graphical card comprises:
  - a graphical carousel that shows statuses of a subset of the applications associated with the specific site;
  - a scatterplot that shows data points representative of the performance levels of the applications associated with the specific site; and
  - a movable selection filter that overlays the scatterplot and facilitates selecting, from the data points by sliding over the scatterplot, the subset of applications whose statuses are shown in the graphical carousel; and
  - a third graphical card that is positioned in a third section of the graphical user interface in the single view and graphically represents the third subset of network objects.

\* \* \* \* \*